United States Patent Office 3,343,219
Patented Sept. 26, 1967

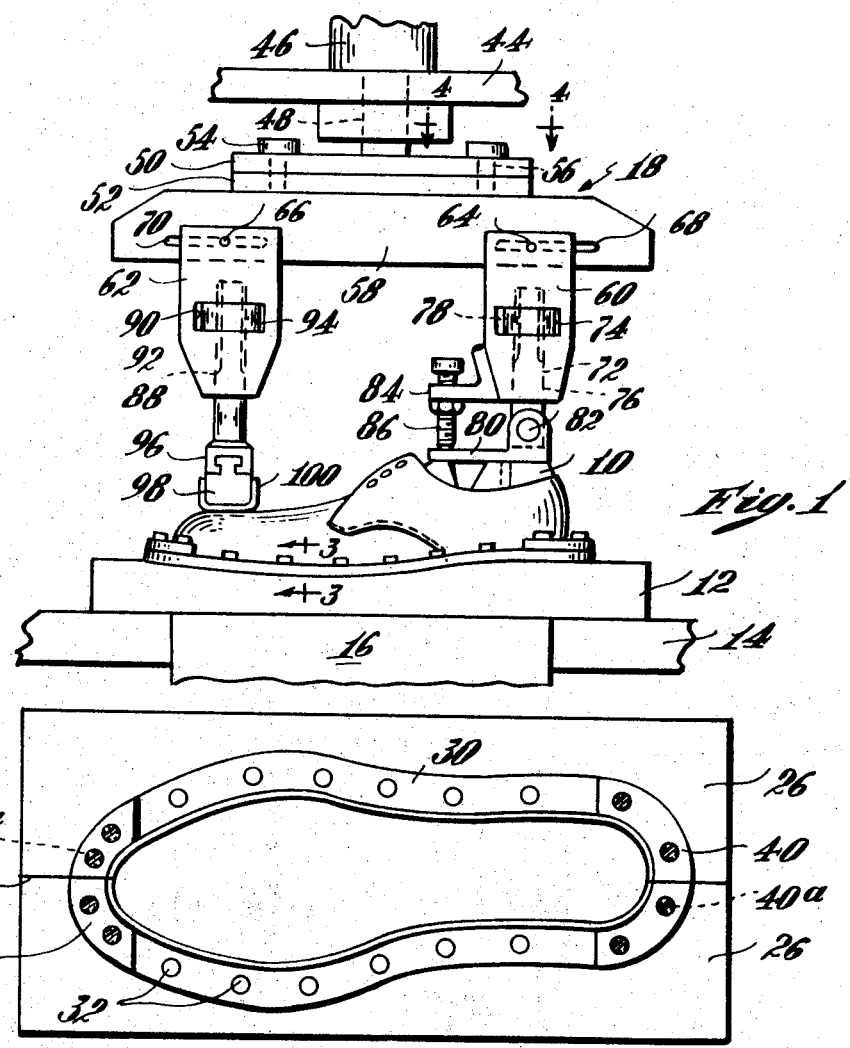
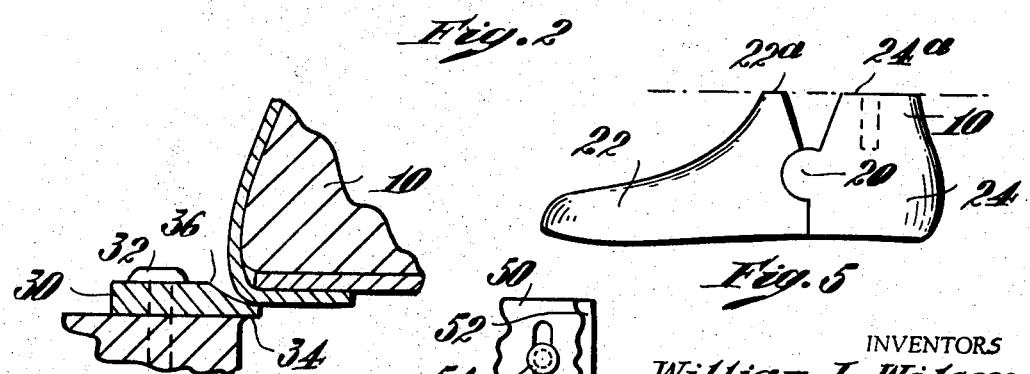

3,343,219
SHOE SOLE MOLDING APPARATUS
William L. Wilcox, Malden, and Julius G. Winkler, Lexington, Mass., assignors to International Vulcanizing Corporation, Waltham, Mass., a corporation of Massachusetts
Filed Oct. 18, 1965, Ser. No. 497,040
13 Claims. (Cl. 18—17)

This invention relates to the manufacture of shoes wherein an upper of suitable kind is mounted on a last and supported with its bottom engaged with an open top mold for application of the bottom thereto, either by placing a bottom-forming material in the open mold, lowering the lasted upper into engagement with the open top of the mold to close the same, and applying heat and pressure, or by injection of a suitable bottom-forming composition into the mold with the last already seated in engagement with the open top thereof.

The bottom-forming material, which will be referred to hereinafter as an "elastomer" and which may be of any suitable kind known in the art for this purpose, is made fluid or is injected as a fluid to cause it to conform to the mold and to the bottom of the upper to effect its attachment to the upper. Pressure is employed to minimize voids, to obtain a good bond between the elastomer and the upper and in order to avoid leakage of the elastomer between the bottom of the upper and the top of the mold ring, and the latter is shaped to conform as closely as possible to the bottom contour of the last at the shoulder. In order to obtain the maximum benefits of lasting when employing this method of bottom-attaching, it is desirable to employ the wood last to which the upper is lasted for holding the upper in engagement with the mold ring. Since it is customary to employ the same mold ring for attaching the bottoms to several size shoes because it is not economically feasible to keep a stock of all sizes on hand and the bottoms of the lasts are usually not uniformly smooth due to shaving for style changes and the hard knocks in use and the upper materials are not uniformly thick, it is difficult to maintain a seal between the bottom of the lasted upper and the top of the ring sufficiently tight to prevent escape of the elastomer. Moreover, application of pressure to the last high enough to effect a seal tends to damage the last and/or the upper material; if not uniformly applied tends to rock or tilt the last relative to the ring; and if the last is articulated tends to break the last at the hinge.

The principal objects of this invention are to provide a mold assembly for the foregoing purposes which is so designed as to enable applying pressure to the lasted upper to hold its bottom engaged with the mold ring sufficiently tight so as to prevent escape of the elastomer but without employing a pressure so high as to damage the last and/or upper material; to provide an assembly in which the means for applying pressure and the last are interengageably associated to insure substantially uniform pressure between the bottom of the lasted upper and the open top of the side ring throughout contact therebetween; to provide an assembly with means for applying pressure which is adjustable lengthwise of the last and transversely of the last; to provide a mold assembly in which there is means for locating the ends of the lasted upper on the open top of the mold ring in alignment with the mold cavity; and to provide a mold assembly in which there is sealing means circumferentially of the open top of the side ring adapted to support the bottom of the lasted upper in such fashion as to minimize escape of the elastomer between the top of the mold cavity and the bottom of the shoe.

As herein illustrated, the mold assembly comprises a last having a forepart and heel end, a mold ring having an open top surrounded by a lip on which the bottom of the last with the upper thereon is adapted to be held for injection of an elastomer into the mold cavity beneath the lasted upper, and pressure-applying means supported above the last comprising a beam disposed lengthwise of the mold, toe and heel-engaging parts mounted on the beam for engagement with the last, and means for applying pressure to the lasted shoe through the parts and beam to prevent escape of the elastomer between the bottom of the lasted upper at the shoulder and the lip on which it rests. The heel-engaging part is designed to apply pressure to the top or the neck of the last in such fashion that the pressure between the bottom of the lasted upper and the lip at the top of the mold cavity is substantially uniform peripherally of the bottom. Application of uniform pressure is achieved by providing flat bearing surfaces on the neck of the last which are substantially parallel to the plane of the open top of the mold cavity and providing pressure-applying means for engagement with the aforesaid flat bearing surfaces adapted to be adjusted lengthwise of the mold cavity, transversely of the mold cavity and about a transverse axis parallel to the top of the mold cavity. A hinged last is employed and the bearing surfaces are provided at opposite sides of the hinge so that the pressure does not tend to break the last at the hinge. The toe engaging part is also adapted to be adjusted lengthwise and transversely of the mold cavity and both the toe engaging part and the heel engaging part are adjustable vertically with respect to the open top of the mold cavity.

The invention will now be described in greater detail with reference to the accompanying drawings wherein:

FIG. 1 is an elevation of a mold assembly showing a lasted upper resting on a mold ring with pressure-applying means above it holding it engaged with the open top of the mold ring;

FIG. 2 is a plan view of the mold ring with a lip at the open top and positioning means at each end;

FIG. 3 is a fragmentary vertical section taken on the line 3—3 of FIG. 1;

FIG. 4 is a fragmentary plan view taken on the line 4—4 of FIG. 1; and

FIG. 5 is an elevation of an articulated last sectioned at the upper part of the neck to show the bearing surfaces at each side of the hinge.

Referring to the drawings (FIG. 1), the bottom-attaching apparatus herein illustrated, comprises a last 10, a mold ring 12, a support 14 on which the mold rings rests, a sole plate 16 and pressure-applying means 18 for holding the last in engagement with the top of the mold ring. The sole plate is movable in the support 14 relative to the bottom of the last by suitable means such as illustrated in Patent No. 3,018,517, dated Jan. 30, 1962.

The last, as shown in FIG. 5, comprises a forepart 22 and heel end 24 connected by a hinge 20 so as to enable breaking the last to assist in removing the last from the finished shoe. In accordance with one aspect of this invention, the parts 22 and 24 are provided with flat bearing surfaces 22a and 24a which are accurately machined to lie in a common plane when the last is unbroken, that is, when the parts 22 and 24 occupy their normal position. The plane of the bearing surfaces 22a and 24a is also designed to be substantially parallel to the open top of the mold cavity. The last is preferably the wood last upon which the upper was originally lasted.

The side ring 12 is comprised of two halves 26—26 split medially, the interfaces 28—28 of which are held engaged with each other during the molding operation by suitable mechanism such as is disclosed in Patent No. 2,878,523, dated Mar. 24, 1959. The mold halves are separated to permit removing the finished shoe and are returned and held in engagement with each other during application of the elastomer to the bottom of the lasted upper.

To provide a good seal between the top of the mold and the bottom of the lasted upper, a narrow two-part rim 30 (FIG. 2) is placed about the open top of the side ring and fastened thereto by bolts 32. The inner edge of the rim 30 has a concave inwardly and downwardly sloping surface 36 which intersects a vertical surface 38 and forms a supporting lip 34 around the eneire open top of the mold cavity on which the shoulder of the lasted upper is adapted to rest as shown in FIG. 3. The relatively sharp right angular edge formed by the intersection of the surfaces 36 and 38 provides substantial line contact between the lip and the upper material which helps to affect a seal all the way around the bottom without excessive pressure.

Positioning plates 40 and 42 are mounted on the side ring above the rim 30 at the toe and heel and conveniently are fastened to the side ring halves by the same bolts as are employed for fastening the rim thereto. The plates 40 and 42 contain enlarged holes 40a and 42a to permit adjustment and provide for aligning the lasted shoe with the mold cavity prior to application of pressure by the simple expedient of just dropping the shoe into position.

The pressure-applying means 18 is supported above the mold ring on a frame 44, only a portion of which is shown herein, for movement relative to the mold ring. Movement is provided for by a cylinder 46 fastened to the upper side of the frame 44 which has projecting from its lower end a piston rod 48. The lower end of the piston rod has attached to it a plate 50 and a plate 52 is adjustably fastened to the underside of the plate 50 by bolts 54—54 (FIG. 5) which extend through slots 56—56 arranged transversely of the plate 50 thus enabling adjustment of the plate 52 transversely with respect to the mold cavity. A rigid bar 58 is fastened to the lower side of the plate 52 and has mounted on it two hangers 60 and 62. The hangers 60 and 62 are supported for movement lengthwise of the mold cavity and relative to each other by pins 64 and 66 respectively, engaged within horizontal slots 68 and 70 formed in the bar 58.

The hanger 60 contains a vertical opening 72 and a transverse opening 74 through which the vertical opening 72 passes within which are mounted, respectively, a threaded spindle 76 and a nut 78 so that the spindle 72 may be adjusted height-wise by rotation of the nut 78. A flat rigid plate 80 is pivotally supported on a pin 82 at the lower end of the spindle 76 for engagement with the bearing surfaces 22a and 24a of the last when the latter is resting on the side ring. A bracket 84 is fastened to the forward side of the hanger 60 and adjustably holds a screw bolt 86, the lower end of which is adapted to have contact with the plate 80 and provides means for adjusting the plate 80 about its pivot 82, the axis of which is parallel to the top of the mold cavity, so that the lower surface of the plate is parallel to the bearing surfaces 22a and 24a of the last and so as to apply pressure to the last which is uniform around the entire bottom of the last. The plate 80 is rigid and is long enough to span the gap between the bearing surfaces 22a and 24a at opposite sides of the hinge 20.

The hanger 62 contains a vertical opening 88 and a transverse opening 90 intersected thereby which are adapted to support, respectively, a threaded spindle 92 and a nut 94 so that rotation of the nut 94 enables raising and lowering the spindle relative to the mold cavity. A block 96 is fastened to the lower end of the spindle 92 and has rabbetted into its underside a block 98 to which there is fastened a pad 100 of flexible material which will not mark the upper by contact therewith.

The pressure-applying means 18, as thus described, provides for applying pressure to the neck of the last in such fashion that the last is not tipped or tilted relative to the mold ring, that there is no tendency to break the last at the hinge, and so that the pressure around the entire periphery of the bottom is substantially uniform. This, together with the fact that the lip as heretofore described provides for substantial line contact between the shoulder of the last and the rim at the top of the mold ring, enables obtaining a seal between the bottom of the shoe and the mold cavity which prevents escape of the elastomer without an excessive application of pressure and in spite of irregularities in the last, the upper material and differences in the size of the last and the mold ring.

While the apparatus as herein illustrated is designed especially for articulated lasts, that is, lasts where the forepart and heel ends are hinged to each other to enable breaking the last, it is useful and within the scope of the invention to employ it with straight lasts since it enables applying pressure uniformly around the entire bottom of the last and provides the aforesaid beneficial results whether the last is wood or metal.

It should be understood that the present disclosure is for the purpose of illustration only and that this invention includes all modifications and equivalents which fall within the scope of the appended claims.

We claim:

1. Apparatus for use in the manufacture of shoes by injection molding of the bottom to a lasted upper, comprising a last on which an upper is supported, said last having a forepart and a heelend part, a hinge connecting the forepart and heelend part for pivotal movement which permits foreshortening of the last to enable inserting and removing the last from the shoe, a mold embodying a side ring and a sole plate collectively providing an open top mold cavity having a rim at the top on which the bottom of the last with the upper thereon is adapted to be held during the formation of the bottom to the upper, means movable relative to the open top of the mold cavity to apply pressure to the last resting on the rim to hold the bottom of the lasted upper engaged with the rim, and bearing means on the last forwardly and rearwardly of the hinge providing flat surfaces substantially at right angles to the direction of the applied pressure, said bearing means being so adapted as to distribute the pressure substantially uniformly throughout contact of the engaging portions of the bottom of the lasted upper with the rim of the cavity.

2. Apparatus for use in the manufacture of shoes by injection molding of the bottom to a lasted upper, comprising a last on which an upper is supported, said last having a forepart and a heelend part, a hinge connecting the forepart and heelend part for pivotal movement which permits foreshortening of the last to enable inserting and removing the last from the shoe, an open top mold having a rim peripherally thereof on which the bottom of the last with the upper thereon is adapted to be placed for application of pressure to the supporting last to press the bottom of the lasted upper into engagement with the rim, and pressure applying means for applying pressure to the last comprising a platen supported for movement perpendicular to the mold cavity, a beam mounted to the underside of the platen, said beam extending longitudinally of the mold cavity and being adjustable on the platen transversely of the mold cavity, a pair of hangers mounted on the beam in longitudinally spaced relation for adjustment longitudinally on the beam relative to the cavity and to each other, a screw supported on each hanger with its axis perpendicular to the cavity, means on each hanger for adjusting the screw vertically relative to the cavity, a heelend support pivotally connected to the lower end of one screw for movement about a horizontal axis transverse to the mold cavity, and a toe support fixed to the lower end of the other screw.

3. Apparatus according to claim 1, wherein the means for applying pressure is adjustable longitudinally of the mold cavity.

4. Apparatus according to claim 1, wherein the means for applying pressure is adjustable transversely of the mold cavity.

5. Apparatus according to claim 1, wherein the means for applying pressure is adjustable perpendicularly to the mold cavity.

6. Apparatus according to claim 1, wherein the means for applying pressure comprises a flat rigid plate adapted to have contact with said bearing surfaces forwardly and rearwardly of the hinge.

7. Apparatus according to claim 1, wherein the pressure-applying means embodies in addition to the means for applying pressure to said bearing surfaces a toe support adapted to apply pressure to the toe of the last forwardly of the hinge.

8. Apparatus according to claim 7, wherein there is means supporting the toe support for adjustment longitudinally, transversely and perpendicularly to the mold cavity.

9. Apparatus according to claim 1, wherein the rim has a transversely concave surface of greater radius of curvature than the radius of curvature of the upper at the shoulder of the last.

10. Apparatus according to claim 1, wherein the rim has a transversely concave surface which intersects the inner edge of the rim at right angles.

11. Apparatus according to claim 1, wherein there are gauge members at the ends of the mold cavity operable, by engagement with the ends of the lasted upper, to hold the latter aligned with the mold cavity.

12. Apparatus according to claim 1, wherein there are gauge members mounted on the top of the side ring at the opposite ends for receiving the ends of the lasted upper for holding the latter aligned with the mold cavity.

13. Apparatus according to claim 1, wherein there are two-part gauge members adjustably mounted on the side ring at the ends operable, by engagement with the ends of the lasted upper, to hold the latter aligned with the mold cavity.

References Cited

UNITED STATES PATENTS

| | | | |
|---|---|---|---|
| 627,840 | 6/1899 | Butterfield | 18—17 |
| 774,865 | 11/1904 | Butterfield | 18—17 |
| 1,163,589 | 12/1915 | Davenport. | |
| 1,718,174 | 6/1929 | Nielsen | 18—17 |
| 2,619,661 | 12/1952 | Hart | 18—17 XR |
| 2,689,375 | 9/1954 | Hugger. | |
| 2,711,558 | 6/1955 | Baker et al. | |
| 2,770,823 | 11/1956 | Kamborian. | |
| 2,830,324 | 4/1958 | Farmer et al. | 18—17 X |
| 2,968,054 | 1/1961 | Haumann et al. | 18—17 X |
| 3,154,813 | 11/1964 | Fagan et al. | 18—17 |
| 3,182,354 | 5/1965 | Berrill et al. | 18—17 |
| 3,203,049 | 8/1965 | Brown et al. | 18—17 |

FOREIGN PATENTS

| | | |
|---|---|---|
| 1,012,471 | 4/1952 | France. |
| 1,031,629 | 3/1953 | France. |
| 394,564 | 6/1933 | Great Britain. |

OTHER REFERENCES

DAS. 1,098,409, January 1961, German application.

J. HOWARD FLINT, Jr., *Primary Examiner.*